Sept. 25, 1945.    G. W. PANCOE    2,385,461
COVER FASTENER
Filed March 31, 1943    2 Sheets-Sheet 1
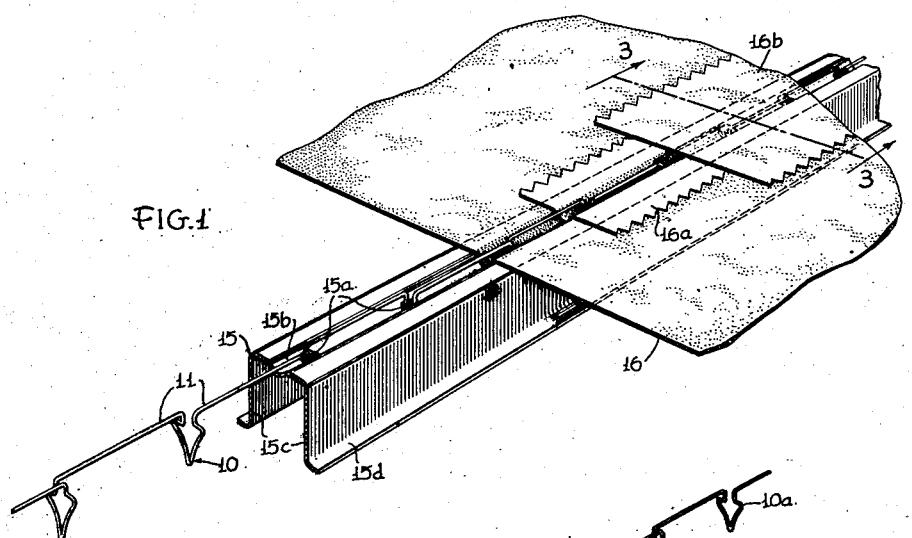
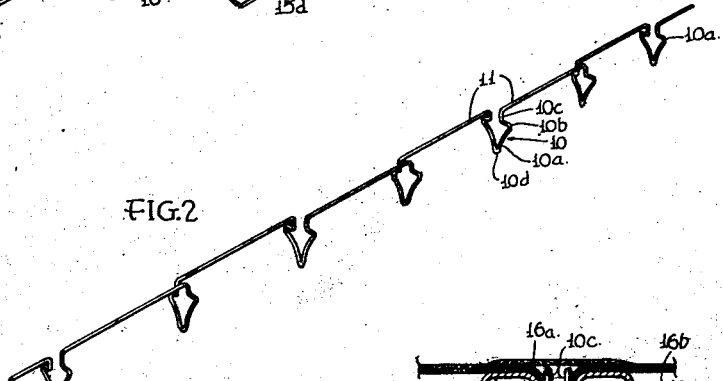
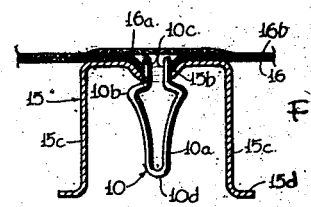
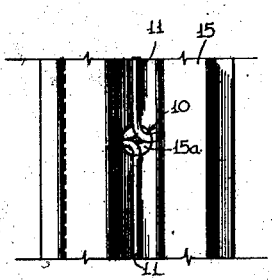
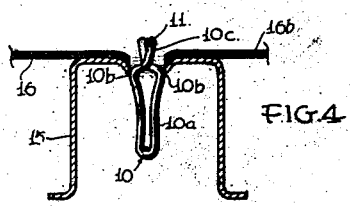
INVENTOR
George W. Pancoe.
BY
ATTORNEY Sept. 25, 1945.　　　G. W. PANCOE　　　2,385,461
COVER FASTENER
Filed March 31, 1943　　　2 Sheets-Sheet 2
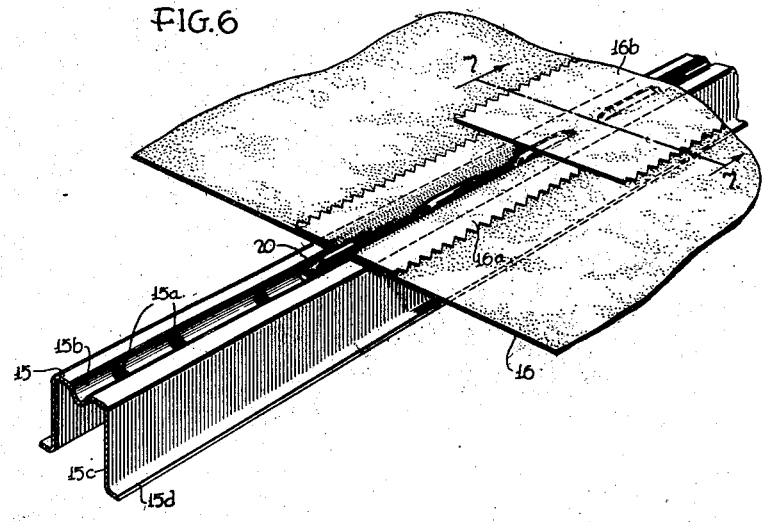
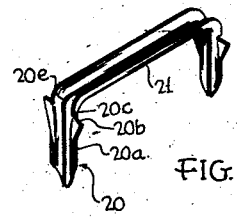
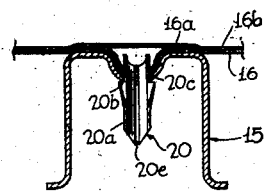
*INVENTOR*
George W. Pancoe.
BY John P. Tarbox.
*ATTORNEY*

Patented Sept. 25, 1945

2,385,461

UNITED STATES PATENT OFFICE 2,385,461

COVER FASTENER

George W. Pancoe, Philadelphia, Pa., assignor to Edward G. Budd Manufacturing Company, Philadelphia, Pa., a corporation of Pennsylvania Application March 31, 1943, Serial No. 481,231

8 Claims. (Cl. 244—132)

This invention relates to cover fasteners, particularly to a clip fastener for securing the cover of an airfoil to the frame thereof, and has for an object the provision of improvements in this art.

One of the particular objects of the invention is to provide a cover fastener which can be quickly applied. Another object is to provide such a fastener which will securely hold the cover in place, particularly one which exerts a continuous securing force upon the parts. Another is to provide a fastener which leaves no objectionable surface projections and which is covered to present a smooth airfoil surface and to prevent deterioration of the fastener and the cover secured thereby. Another object is to provide a fastener which binds the cover to the frame throughout the entire distance between points of attachment and not merely at local points. Another object is to provide a fastener which can be secured to a frame web, sheet or plate upon which the cover lies, as by a snap element passing through a hole, slot, or other form of socket in the web, as distinguished from a fastener which must be engaged with the inner edges of an inturned frame flange. Another object is to provide a cover fastener which provides both lateral and longitudinal adjustment to compensate for irregularities in the size or spacing of attachment openings in the frame web. Another object is to provide a cover fastener which is simple and inexpensive to manufacture. And yet another object is to provide such a fastener which can readily be removed from the outside when the cover requires removal or replacement. This fastener, particularly when made in continuous lengths, can be applied very rapidly, thus eliminating the slow and tedious sewing operations previously required.

The enumerated and other objects of the invention will be apparent from the following description of certain illustrative embodiments thereof, reference being made to the accompanying drawings, wherein:

Fig. 1 is a sectional and perspective view of an airfoil blanket wherein the cover is secured to the frame in accordance with the present invention;

Fig. 2 is a perspective view of the cover fastener strip alone;

Fig. 3 is a transverse section on the line 3—3 of Fig. 1;

Fig. 4 is a similar view during the insertion stage;

Fig. 5 is a top plan view of one of the snap members inserted in the hole of a web;

Fig. 6 is a view similar to Fig. 1 but showing a modification;

Fig. 7 is a vertical section taken on the line 7—7 of Fig. 6; and

Fig. 8 is a perspective of one of the fastener clips of Fig. 6 alone.

In general, the cover fastener comprises a resilient snap element which is adapted to be forced against its own resilience through a frame opening, together with a holding head or backing element which is adapted to clamp the cover upon the surface of the frame. Preferably the frame is recessed at the point of attachment to receive the holding head and avoid objectionable surface projections in the cover. In one form the recess is a longitudinal groove above a strengthening rib in the frame web and the fastener head is a connecting strip, bar, or bight between adjacent snap elements of the clip, the bar lying within the groove. Considering any two adjacent snap elements and a connecting bar, the fastening device corresponds in form to a staple. Normally, however, each snap element is connected to a connecting bar on each side thereof in a continuous strip.

In the preferred embodiment shown in Figs. 1 to 3, the fastener comprises a plurality of snap elements 10 and a plurality of connecting bars 11 formed integrally therewith from a continuous strip of wire stock. The wire is of a rustless type and is very resilient, for example, stainless steel piano wire. Each snap element 10 is formed of a reverse bend or loop in the wire and each loop is bent into a transverse plane whereby the resilient arms 10a of a loop are mutually resistant to the lateral compression required to force them through a socket opening. In effect they form an expansion spring couple. The structure also provides longitudinal resiliency to oppose lengthening or shortening. Before the fastener strip is applied, Fig. 2, the snap elements 10 are in expanded condition and the bars 11 are disposed in alternation on opposite sides of a central vertical plane. During insertion, Fig. 4, the snap elements are more compressed and the bars 11 may be disposed beyond the central vertical plane, that is, with each bar disposed on the side opposite that which it occupied in the unused condition of the fastener. The snap element loops have enough twist out of the transverse vertical plane, Fig. 5, to space the proximate ends of adjacent bars 11 apart sufficiently to avoid interference in crossing the central vertical plane.

The snap element arms 10a are provided with shoulders 10b for engaging beneath the lower edges of the openings in which they are secured. These shoulders may be very abrupt to fully resist all outward movement of the snap elements unless the spring arms are purposely pressed together for removal; or may be slightly tapered to produce a downward clamping action on the head bar 11. The snap elements above the shoulders 10b are provided with necks 10c of a length to match the thickness of the web through which they pass. In the embodiment just described the snap element arms 10a are connected at their inner ends by the tip portion 10d, in which case the expansive resiliency is provided internally within the airfoil frame web.

Figs. 1 and 3 show the use of the cover fastener in an airfoil construction which comprises a frame web 15, and a cover or skin 16 with a reinforcing tape 16a for the seam, and a wider finishing tape 16b. The web 15 is provided with openings or holes 15a for insertion of the snap elements 10. These holes are preferably formed along a groove 15b of the reinforcing rib of the web whereby the bars 11 of the fastener may be disposed and concealed below the surface, leaving the cover free of abrupt projections. The fastener exerts a resilient drawing action on the cover in the groove. The snap elements 10 pass through the cover 16 and its reinforcing tape 15a, and thereafter the finishing tape 16b is applied to conceal and protect the fastener and give the cover a smooth surface over the groove.

The web 15 is shown to be a part of a channel-shaped stringer which also includes sides 15c and flanges 15d; but the web may be formed of other frame elements, for example of the flanges 15d if the frame member should be oppositely disposed. Also the web may include a plurality of frame laminae, instead of one thickness of material as shown.

In placing the fastener, the fabric and its reinforcing tape may be preliminarily pierced by an appropriate tool if necessary to assist the insertion of the snap elements.

In the embodiment shown in Figs. 6, 7, and 8 the fastener comprises the snap elements 20 and the connecting bar 21. In the particular form shown, the fastener is of limited instead of continuous length, there being a single bar provided with two snap elements, one at each end; and the fasteners are placed to provide holding bars 21 between alternate holes 15a only; but the fasteners may be applied to provide holding bars between every pair of adjacent holes and the fasteners may be made in continuous strip form with the strip material doubled at each snap element, if desired. In the embodiment of Figs. 6 to 8 the bars 21 are curved in cross-section to strengthen them and to cause them to fit better in the groove 15b of the frame web 15. In this embodiment the resiliency of the snap elements is derived from their connections with the bar 21 instead of from their inner ends as in the first embodiment, the arms 20a being formed by cutting slots 20e from the ends upward past the shoulders 20b and necks 20c.

Except for the modified fastener member, the parts shown in Figs. 6 and 7 are the same as in Figs. 1 and 2 and carry the same reference characters. The mode of attachment is practically the same in both cases.

It is thus seen that the invention provides an improved cover fastener and an improved airfoil cover attachment, the fastener being simple and inexpensive to manufacture and easy to apply; also that the fastener is sturdy and efficient in use, holding the cover very securely and evenly along the line of attachment; and moreover the fastener is fully concealed below the airfoil surface and covered thereabove, thus avoiding objectionable projections and depressions in the finished airfoil surface. The fastener is particularly adapted for securing fabric covering material to the frame but is suitable for securing other flexible material and may also be used for securing other light covering material if suitably formed to fit in the recesses provided for the head or backing element of the fastener. In applying, the snap elements are very easily inserted in the openings provided therefor and it is not necessary to search for the flanges of the frame members as it is with other forms of fasteners. The snaps or anchoring elements hold tightly in their innermost position and do not move back to cause looseness at the point of anchorage as is the case with certain hook-type fastener elements.

While certain embodiments of the invention have been described in detail for purposes of illustration it will be understood that the invention may have various embodiments within the limits of the prior art and the scope of the subjoined claims.

What is claimed is:

1. A fastener of the character described adapted to secure the cover of an airfoil to the frame thereof, said fastener comprising spaced snap elements having opposed shouldered spring arms adapted to enter spaced openings in a frame web, and a backing bar element connected at opposite ends to the spaced snap elements and adapted to overlie the cover between the snap elements and bind it to the frame web, each of said snap elements having its opposed arms disposed substantially in a plane which is transverse to the axis of said bar element.

2. A fastener as set forth in claim 1, further characterized by the fact that each of said snap elements is connected on the opposite side to another bar element, a plurality of snap elements and a plurality of bar elements being formed in continuous strip form from a single strip of stock.

3. A fastener of the character described adapted to secure the cover of an airfoil to the frame thereof, said fastener comprising a backing bar of sheet material having a longitudinal groove along its back, and a snap element at each end formed of the ends of the sheet material and comprising opposed arms spaced apart by a slot from the lower end and having upwardly and outwardly divergent outer sides and convergent shoulders thereabove, the shoulders being joined to the bar element by necks of sufficient length to pass through a hole in a frame web, and the arms of the snap elements being disposed substantially in a plane at right angles to the axis of the bar element.

4. A fastener as set forth in claim 3, further characterized by the fact that said shoulders are formed with a slight upward and inward inclination to exert a downward binding action on the cover.

5. A fastener of the character described adapted to secure the cover of an airfoil to the frame thereof, said fastener comprising a plurality of spaced snap elements each formed as a loop with opposed spring arms connected together at the lower end and diverging upward to converging shoulders which are joined to necks at the upper end, and a bar element connected to each side of the snap element through the upper end of a neck, the bar elements on each side of a snap element being disposed approximately in alignment when the fastener is in final position, said snap elements both before and after attachment being disposed each in a plane at right angles to the axis of said arms and the ends of said arms being disposed on opposite sides of a transverse plane to provide change in length along the arms without materially affecting the retentive engagement of said shoulders.

6. A fastener of the character described adapted to secure the cover of an airfoil to the frame thereof, said fastener comprising a strip adapted to overlie the cover, and spaced snap elements along said strip adapted to secure the strip and cover to an apertured anchorage, said snap elements being disposed in and having resiliency in planes disposed transversely of said strip, said cover-overlying strip and snap elements being formed of a single piece of strip stock suitably shaped to form the parts.

7. A fastener of the character described adapted to secure the cover of an airfoil to the frame thereof, said fastener comprising a strip adapted to overlie the cover, and spaced snap elements along said strip adapted to secure the strip and cover to an apertured anchorage, said snap elements being disposed in and having resiliency in planes disposed transversely of said strip, said fastener being formed of a single piece of wire suitably bent to form the strip and snap elements.

8. A fastener of the character described adapted to secure the cover of an airfoil to the frame thereof, said fastener comprising a strip adapted to overlie the cover, and spaced snap elements along said strip adapted to secure the strip and cover to an apertured anchorage, said snap elements being disposed in and having resiliency in planes disposed transversely of said strip, said fastener being formed of a single piece of wire suitably bent to form the strip and snap elements, there being more than two snap elements in a strip group with the adjacent ends of the strips spaced apart at the snap elements.

GEORGE W. PANCOE.